Aug. 16, 1932.  E. J. CONTOIS ET AL  1,871,841
COUPLER
Filed May 6, 1931
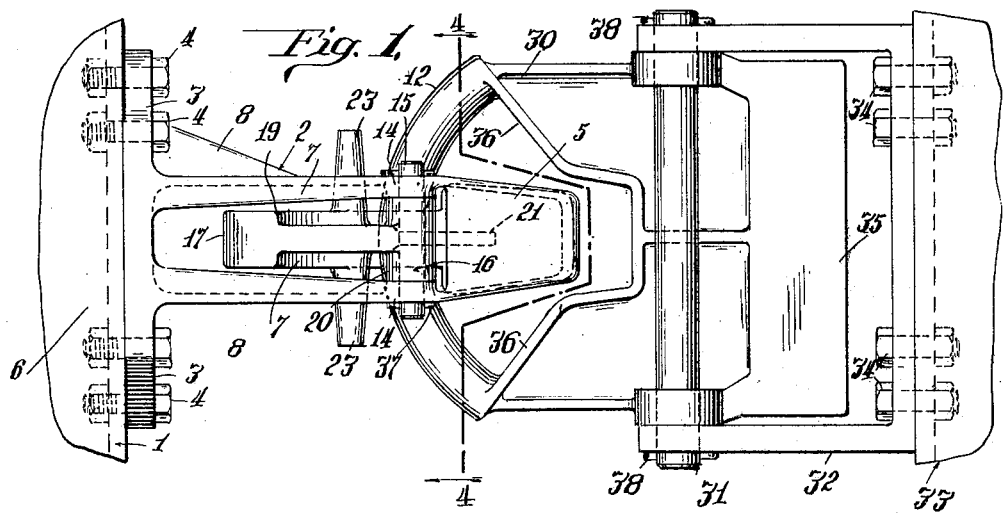
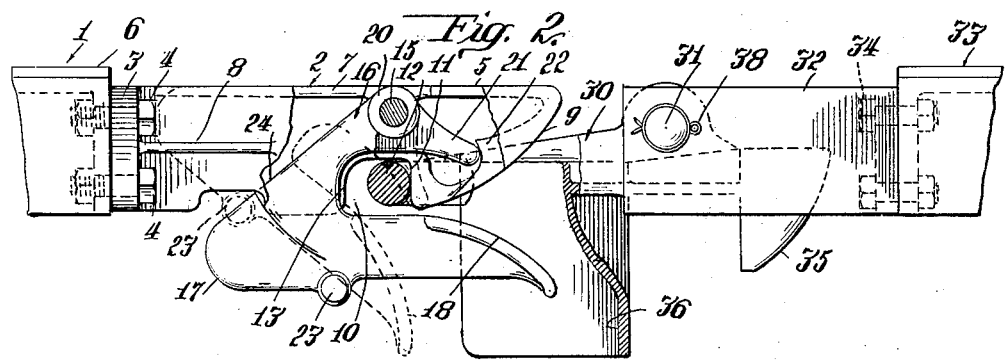
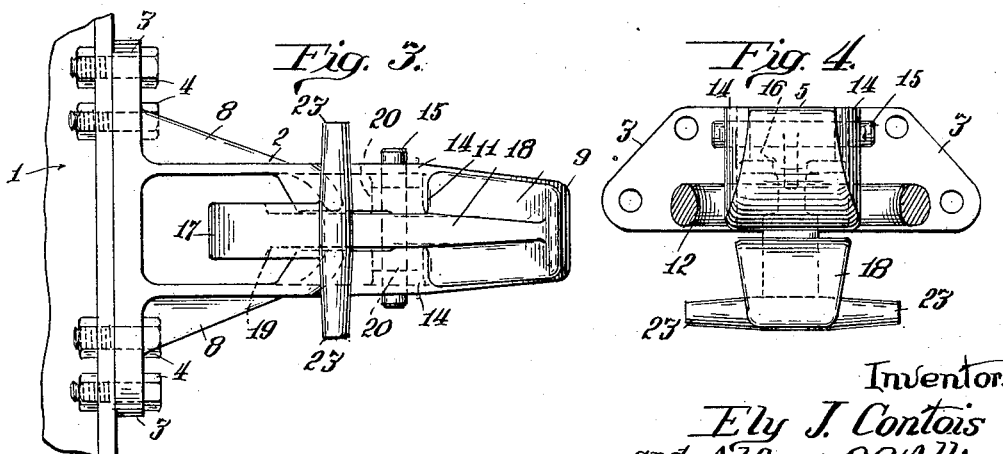
Inventors
Ely J. Contois
and Alfred O. Williams
By Brown, Jackson, Boettcher & Dienner
Attorneys.
Witness
Milton Lenoir Patented Aug. 16, 1932

1,871,841

UNITED STATES PATENT OFFICE

ELY J. CONTOIS AND ALFRED O. WILLIAMS, OF BATTLE CREEK, MICHIGAN, ASSIGNORS TO CLARK TRUCTRACTOR CO., OF BATTLE CREEK, MICHIGAN, A CORPORATION OF MICHIGAN

COUPLER

Application filed May 6, 1931. Serial No. 535,373.

This invention relates to couplers.

Flat topped trucks are commonly used in warehouses and the like to transport merchandise which is loaded on the truck and the truck then coupled to a shop tractor or to another truck to form a train which is pulled by the tractor to convey the merchandise about the premises. The merchandise loaded upon trailer trucks of this type is frequently longer than the truck and of a result overhangs the platform of the truck and frequently projects over the coupling devices of the truck. The couplers of the prior art of which we are aware, have frequently been damaged by this overhanging merchandise for the reason that they have parts which project above the plane of the flat top of the truck, which parts are bent or broken by the merchandise resting upon them.

Trailer trucks of this type are usually low mounted vehicles whose platforms are approximately one foot from the floor. Since a certain minimum amount of clearance between the lowest object on the truck and the floor is absolutely necessary to permit navigation of the truck about the premises and over obstacles likely to be encountered, the problem of providing a satisfactory coupling which does not project above the top of the truck and at the same time affords sufficient clearance between its lowermost portion and the floor, is one of considerable moment because of the relatively small available working space that can be occupied by the coupling devices.

In our present invention we have provided, as a principal object, a new and improved coupling arrangement adapted to be connected to trailer trucks and other similar devices, an arrangement which can be operated to couple and uncouple the vehicle without projecting any of the working parts of the coupling mechanism above the upper surface of the truck. The improved coupling of our invention affords ample clearance between its lowermost portions and the floor, so that the trailers may be handled about the premises as required without danger of the coupling striking obstructions.

In the preferred embodiment of our invention, we provide a coupling ring attached to one end of the vehicle and pivoted to swing about a horizontal axis. The ring is counterbalanced so that when free to swing it will assume a substantially horizontal position. The complementary parts of the coupling device consist of a stationary member attached to the end of the vehicle and having a beveled surface adapted to pass over the upper surface of the coupling ring, to thereby guide the ring into a transverse straight walled socket disposed in the lower surface of the stationary member. A latch pivoted to the stationary member and counterweighted to swing one of its arms across the lower opening of the socket serves to lock the coupling ring in the socket to thereby complete the coupling operation. When it is desired to uncouple the vehicles, the latch is swung upward about its pivot to open the lower surface of the socket and to bring the upper portion of the latch member into oblique relation with the walls of the socket to thereby guide the ring out of it. During this swinging operation of the latch lever, no part of it projects above the upper surface of the stationary member and since that surface is preferably disposed slightly below the upper surface of the truck platform, no part of the coupling means projects above the platform surface either during a coupling, a pulling or an uncoupling operation.

Our invention will be best understood by reference to the accompanying drawing in which a preferred embodiment of it is shown by way of example, and in which:

Figure 1 is a top side plan view of the coupler;

Figure 2 is an elevational view of the coupler, with certain parts broken away to show its interior construction;

Figure 3 is a bottom side plan view of the coupling member; and

Figure 4 is a cross sectional view taken substantially along the line 4—4 of Figure 1.

Referring now to the drawing in more detail, we have shown the end member 1 of a shaft trailer or skid truck, which truck may be of any preferred construction, for example such as a truck of the type shown in the copending application of Alfred O. Williams, Serial No. 421,350, filed January 17, 1930. This end member 1, usually a channel or angle iron, affords a flat rigid surface upon which the coupler members are attached.

The improved coupler of our invention comprises a tongue-like stationary frame 2 which is flanged as at 3 and attached to the end member 1 of the trailer truck in any preferred manner such as by the bolts 4. The upper surface of this frame is flat and preferably the member is mounted upon the truck frame in such a manner that this upper surface 5 is disposed slightly below the upper surface 6 of the platform portion of the truck, although, if desired, it may be flush with that surface. As shown, the frame 2 is a steel hollow casting suitably ribbed as at 7 to reinforce it against stresses in all directions and ribbed as at 8 to its flange portion to reinforce it against lateral stresses.

The free end of the member 2 is beveled or sloped downwardly at 9 to form a camming surface which leads to a rectangular socket 10 disposed in its lower surface, which socket is adapted to receive the coupling ring of a complementary coupling member. The front wall 11 of this socket is disposed at right angles to the longitudinal axis of the frame and it is against this surface that the coupling ring 12 bears when the trailer is being pulled. The opposite wall 13 of this socket is likewise disposed at right angles to the longitudinal axis of the coupling frame 2 to permit the trailer to be backed.

As shown, the coupling ring 12 is arcuate and therefore the front and back walls 11 and 13 respectively of the socket 12 are formed arcuate as will be seen in Figure 3, to permit limited sidewise movement of the coupling members when they are in pulling position.

The frame 2 is provided with transversely disposed bosses 14 adapted to receive a pivot pin 15 by which the latch member 16 is mounted in the frame. This member consists of a generally U-shaped structure having a counterweighted portion 17 and having an arcuate lip 18 which is disposed adjacent the free end 9 of the frame 2 when the latch is in position in the frame.

The frame 2 is hollow to form a slot or pocket 19 in which the latch 16 is suspended and the boss 14 projects into this pocket and engages cooperating bosses 20 on the latch to prevent sidewise movement of the latch in the frame.

The latch also contains a shorter upper arm 21 which engages a shoulder 22 on the frame to limit the movement of the latch in a counter clockwise direction about its pivot, Figure 2, under the influence of the counterweight 17. When the leg 21 of the latch strikes the shoulder 22 the arcuate lip 18 is disposed adjacent to but not touching the lower surface of the frame, in which position it blocks the opening of the transverse socket 10 in which the coupling ring 12 is disposed.

The lower surface of the frame 2 is provided with a recess 22 and the latch is provided with outwardly projecting lugs 23 which register with this recess and strike against the walls of it to limit the movement of the latch about its pivot in a clockwise direction, Figure 2. The position assumed by the latch at the limit of this clockwise movement about its pivot is shown in dotted lines in Figure 2, and it will be noted that the arcuate lip 18 registers with the lower edge of the back wall 13 and projects in a generally downward path therefrom. The upper lip 21 of the latch is then disposed obliquely of the front wall 11 and with its tip portion registering with the lowermost portions of that wall, in which position it serves as a guide which permits the coupling ring 12 to be guided out of the socket 10. When the latch is in this extreme position, its straight back and upper surface 24 is substantially flush with the upper surface 5 of the frame member, but does not project above that surface. The tip end of the lip 18 is swung downwardly into a position somewhat below the coupling member, however since the trailer is not ordinarily in motion when the latch is in this position, this reduction in floor clearance is not material.

The cooperating coupling ring 12 is preferably formed as an integral part of an apron 30 which is pivoted on a transversely disposed pin 31 journaled in a U-shaped bracket 32 which is attached to a frame member 33 of a truck in any preferred manner such as by the bolts 34. The apron 30 is provided with a counterweight 35 disposed on the opposite side of the pivot 31 and so proportioned that its weight equals the weight of the apron and ring 12, and therefore swings the coupling member into a substantially horizontal position.

The apron 30 is provided with generally V-shaped vertical walls 36 across the open end of which the coupling ring 12 is disposed, these walls serving as a guide to assist in bringing the frame 2 of the complementary coupling member into proper relation with the coupling ring 12. Because of the V-shape opening in the apron, the two members can be brought into coupling relation when the longitudinal axes of the vehicle are out of line by a considerable amount, this arrangement being particularly useful in coupling long trains of trailer trucks.

The pins 15 and 31 are preferably held in their respective brackets by means of counter pins 37 and 38 respectively, which pins may obviously be replaced by other suitable fastening means as desired.

From the foregoing it will be apparent that the beveled surfaces 9 and 18 of the frame and latch members respectively together form a V-shaped opening leading to the socket pin in the frame member. The apron walls 36 form a similar V-shaped opening disposed with its axis at right angle to the axis of the V openings formed by the latch members, and, by this arrangement, the coupling ring 12 can be brought into engagement with the socket pin even though the vehicles are not exactly aligned vertically and exactly aligned in a horizontal plane. Coupling is accomplished by merely pushing the coupling ring into the socket in the frame, in which position it is overbalanced slightly, that is the ring portion 12 is pushed down by the beveled surface 9 of the frame into a position slightly below its normal free moving position. The counterweight 35 on the apron therefore urges the ring portion upward against the upper surface of the socket 12, thereby insuring that the ring will not readily fly out of the socket. The coupling ring 12 is preferably of circular cross section and when the vehicles are being pulled it bears at right angles against a planar wall, so that there is no tendency for the ring to be pulled out of the socket. The walls against which the ring bear are arcuate so that when the vehicles are misaligned, as will be the case when turning a corner, the ring still bears squarely against a vertical wall and therefore is not forced out of the socket. A certain amount of movement of one vehicle with respect to the other in a vertical direction is possible with the coupler of our invention without danger of the vehicles becoming uncoupled. This permits operation of the vehicle up and down ramps and over similar inclined surfaces.

When it is desired to uncouple the vehicle the latch member is manually rotated about its pivot to bring it into the position in which it is shown in the dotted lines in Figure 2, and the one vehicle is then moved with respect to the other to cause the ring 12 to slide over the oblique surface of the tongue 21 out of the socket 10, the ring being movable about its horizontal pivotal axis so that this operation may be readily performed.

It will be observed that both of the coupling members are disposed entirely below the upper or platform surfaces of the vehicles to which they are attached, and that the latch may be operated to latch or unlatch the coupling without swinging any of its parts above the platform surfaces. Therefore the platforms may be loaded with merchandise that overhangs the ends of the trailer without in any way interfering with the operation of the coupling and without striking and damaging it. The parts of the coupler, preferably composed of steel castings or steel forgings, are simple and rugged and capable of withstanding the stresses placed upon them in the ordinary usage of the trucks of this kind.

While we have chosen to show our invention by illustrating a preferred embodiment of it, we have done so by way of example only as there are many modifications and adaptations which can be made by one skilled in the art within the teachings of our invention.

Having thus complied with the statutes and shown and described a preferred embodiment of our invention, what we consider new and desire to have protected by Letters Patent is pointed out in the appended claims.

What is claimed is:

1. The combination with a pair of flat top vehicles of a coupling means comprising a coupling ring attached to one vehicle below its top, a coupler frame attached to the other vehicle below its top and containing a transverse slot into which said ring is positioned during a coupling operation, said slot having straight walls against which the ring bears to pull the vehicle, and a latch pivoted to said frame to swing through an arc disposed below the top of the vehicle to lock said ring in said slot.

2. The combination with a pair of flat top vehicles of a coupling means attached part to each of the vehicles below the tops thereof and comprising a coupling ring, coupler frame against which the ring pulls to pull the vehicles, and a latch for holding the ring in the frame, said latch and ring being entirely operable from below the plane of the vehicle tops to couple and uncouple the vehicles.

3. The combination with a pair of flat top vehicles of a coupling means attached part to each of the vehicles below the tops thereof and comprising a coupling ring, a coupler frame having a socket in its lower edge into which the ring passes and straight side walls against one of which the ring bears to pull the vehicle and against the other one of which the ring bears to push the vehicle, and a U-shaped latch pivoted to swing one of its sides across said socket to latch the coupling and to swing with its other sides oblique to said straight sides of the socket to unlatch the coupling.

4. The combination with a pair of flat topped vehicles of a coupling means therefor comprising, a stationary frame attached to one vehicle below its top, the under surface of said frame defining an arcuate path extending downwardly from the free end of the frame, a latch pivoted to said frame and disposed below the top of said vehicle, said latch comprising two substantially parallel arms, there being a transverse downwardly opening socket in the lower face of said frame across the open side of which one arm of said latch extends, the upper side of said latch arm defining an arcuate path extending upwardly from the free end of the arm, the upper side of said latch arm and the under surface of the free end of said frame together forming a V whose apex is adjacent said socket, and a coupling ring pivoted to the other vehicle below its top and adapted to engage said V and to be guided thereby into said socket to couple the vehicles together.

5. The combination with a pair of flat top vehicles, of a coupling means comprising a draw ring pivotally mounted on one of the vehicles below its top and biased to remain in a horizontal position, a stationary coupling member attached to the other vehicle below its top and having a beveled end surface over which the top side of said ring slides as said vehicles are brought together in a coupling operation, a seat in the under face of said stationary member into which said ring is guided by said surface, and a latch pivoted to said stationary member and disposed wholly beneath its upper surface and containing an element which engages the lower side of said ring to retain it on said seat.

6. The combination with a truck having a flat platform for receiving loads of merchandise, of a coupler comprising a frame rigidly attached to the truck frame below the plane of said platform and disposed entirely below that plane, said frame containing a U-shaped slot opening into the lower surface of the frame, and a latch member pivoted to said frame and disposed entirely below said plane, said latch having an integral arm portion normally disposed in a horizontal position across the open end of said slot.

7. The combination with a truck having a flat platform for receiving loads of merchandise, of a coupler comprising a frame rigidly attached to the truck below the frame of the plane of said platform and disposed entirely below that plane, a seat formed in the underside of said frame, the under surface of said frame extending in an arcuate path from the one end of said seat to the free end of the frame, a latch having two arms one of which is pivoted to said frame, said latch being biased to swing the other one of said arms against the under side of said frame, said latch being disposed below said plane and being shaped so that said other one of said arms cooperates with the arcuate face of said frame to form a V-shaped guide for guiding a cooperating coupling member into said seat.

8. A coupler comprising a stationary member having a flanged end by which it is attached to a vehicle, said member having a straight side disposed uppermost, draw bar seat in the opposite side of said member with which a draw bar is adapted to register, a latch pivoted to said member and adapted to retain the draw bar on said seat, and means for limiting the movement of said latch about its pivot, said means preventing any part of the latch from projecting above the upperside of said stationary member.

9. A coupler comprising a generally rectangular shaped member having flanges at one of its ends by which it is attached to a vehicle, the upper side of said member being straight and substantially horizontal when the member is mounted on a vehicle, a seat formed in the lower surface of said member, a generally U-shaped latch pivoted at one of its ends to said member at a point directly over said seat but below said straight side, said latch being counterweighted to swing its free end adjacent said seat, and a shoulder formed in said member above said seat and engaged by the other end of said latch to limit its movement about its pivot.

10. A coupler comprising a generally rectangular shaped member having flanges at one of its ends by which it is attached to a vehicle, the upper side of said member being straight and substantially horizontal when the member is mounted on a vehicle, a seat formed in the lower surface of said member, a generally U-shaped latch pivoted at one of its ends to said member at a point directly over said seat but below said straight side, said latch being counterweighted to swing its free end adjacent said seat, a shoulder formed in said member above said seat and engaged by the other end of said latch to limit its movement about its pivot, and bosses on said latch adapted to engage said member to limit the movement of said latch about its pivot in the opposite direction.

11. A coupler member comprising a flanged flat top frame which is hollow and provided with pivoted bosses projecting inwardly in it, a seat disposed transversely of the frame and in its lower side beneath said bosses, a latch disposed in said frame between said bosses, a pivot pin extending through the latch and bosses to mount the latch for movement about an axis disposed transversely of said frame, and a counterweight on said latch for biasing it to swing about said axis against the lower face of said frame.

12. A coupling comprising a stationary member having a socket in its lower face, said socket having front and rear walls disposed normal to the axis of the member, a coupling ring pivoted to swing about a horizontal axis to bring it into registration with said socket, a latch pivoted to said member, a lip on said latch disposed across said socket when the latch is in its normal position to lock said ring in it, and a second lip on said latch disposed obliquely of the walls of said socket when the latch is swung about its pivot to guide the ring out of said socket.

13. A coupling comprising a stationary member having a socket in its lower face, said socket having front and rear walls disposed normal to the axis of the member, a coupling ring pivoted to swing about a horizontal axis to bring it into registration with said socket, and a U-shaped latch pivoted to said member and containing a counterweight which swings it about its pivot to close said socket and thereby lock the ring in the socket.

14. The combination with a pair of flat topped trucks, of an automatic coupler comprising a stationary member attached to one of said trucks below its top, a draw bar pivotally connected to the other truck below its top, said bar being biased to swing its free end upward, a coupling seat on the under side of said member, a sloping face adapted to engage said draw bar to guide it into said seat as the trucks are brought together for coupling, a latch pivoted to said member below its upper surface and biased to swing its free end upward against the lower edge of seat to lock the draw bar therein, and means for limiting the movement of said latch about its pivot, said means preventing any part of the latch from projecting above the upper surface of said member.

In witness whereof, we hereunto subscribe our names this 2nd day of May, 1931.

ELY J. CONTOIS.
ALFRED O. WILLIAMS.